Jan. 1, 1935.  C. O. PRATT ET AL  1,986,118
CHARGING MACHINE
Filed July 14, 1931   3 Sheets-Sheet 1

INVENTORS
Charles O. Pratt
Olav Tweit
BY
ATTORNEY

Jan. 1, 1935. C. O. PRATT ET AL 1,986,118
CHARGING MACHINE
Filed July 14, 1931 3 Sheets-Sheet 2

INVENTORS
Charles O. Pratt
Olav Tweit
BY
ATTORNEY

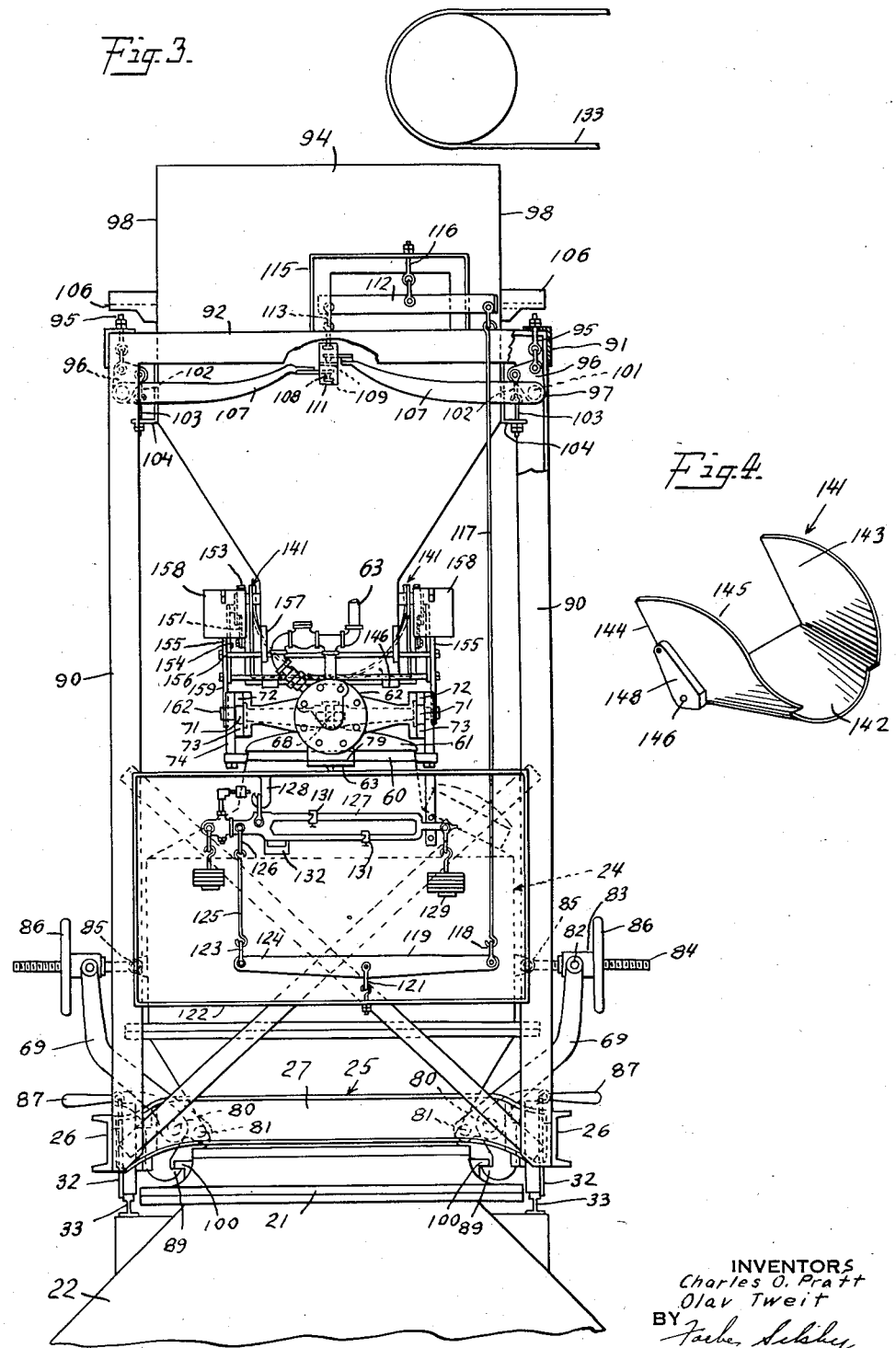

Patented Jan. 1, 1935

1,986,118

UNITED STATES PATENT OFFICE 1,986,118

CHARGING MACHINE

Charles O. Pratt, Maplewood, and Olav Tweit, West Orange, N. J., assignors to Semet-Solvay Engineering Corporation, New York, N. Y., a corporation of New York Application July 14, 1931, Serial No. 550,696

11 Claims. (Cl. 214—2)

This invention relates to charging apparatus, and more particularly, to a charging machine designed to supply predetermined amounts of fuel at regular intervals to a generator of a gas plant.

One object of this invention is to provide an improved charging device involving a substantially stationary or fixed hopper which is permitted only limited vertical movement in combination with a fuel magazine adapted to discharge into a gas generator and an accurate weighing mechanism, the hopper and weighing mechanism being arranged to be disposed in counter-balancing relation. The feature of utilizing a substantially fixed hopper in lieu of tiltable hoppers heretofore employed in charging machines results in a more rugged and durable construction and eliminates errors in weighing necessarily present when a tiltable hopper is utilized.

A further object of this invention is to provide a hopper having limited vertical movement arranged to discharge material through the inlet of a fuel magazine, the hopper having a bottom closure adapted to alternately close the bottom of the hopper and serve when open as a conduit or chute for conducting fuel or other material from the hopper into the magazine.

Still a further object of this invention is to equip the nozzle of a fuel magazine with a reciprocating closure plate or cap, which when moved from an open to a closed position or vice versa, actuates the closure means for the hopper. Other objects and advantages of this invention will appear from the following detailed description.

The invention comprehends a carriage on which is mounted a fuel magazine adapted to be positioned over and communicate with a charging opening of a gas generator as for example a water gas generator. A supporting frame is mounted on the carriage. Suspended from the frame is a weigh hopper having only limited vertical movement and arranged to be placed in counter-balancing relation with a weighing mechanism also mounted on the carriage. The weigh hopper is provided at its bottom with a discharge opening arranged to discharge into the inlet of the magazine.

A pair of closure plates are disposed adjacent the discharge opening of the hopper. These plates, when open, pass into the circular inlet of the magazine and form a conduit or chute through which material gravitates from the hopper into the magazine. A cover of the reciprocating type may be utilized to close the circular inlet of the magazine upon completion of delivery of a charge to the magazine. The operating mechanism for the cover is operatively connected with the mechanism for opening and closing the closure plates for the weigh hopper. A vertically reciprocating fuel spreader and closure member for the discharge outlet in the bottom of the fuel magazine is operated in timed relation with the closures for the discharge hopper and the inlet to the fuel magazine. The fuel spreader is reciprocated by a hydraulic cylinder positioned above the magazine, the piston rod of which is extended to connect with the spreader. Preferably a sleeve encases the piston rod and serves to protect it. The portion of the rod extending within the magazine may be protected by an auxiliary sleeve. The sleeve and piston rod extend through a suitable packed bearing positioned on the magazine wall so that it is readily accessible from the exterior thereof.

In the accompanying drawings, which are to be understood as merely illustrative of one embodiment of the invention and not as limiting the invention to the specific embodiment shown—

Fig. 3 is an end elevation of the charging machine shown in Fig. 1; and

Fig. 4 is a perspective of one of the plates closing the discharge outlet of the fuel hopper.

Figure 1:
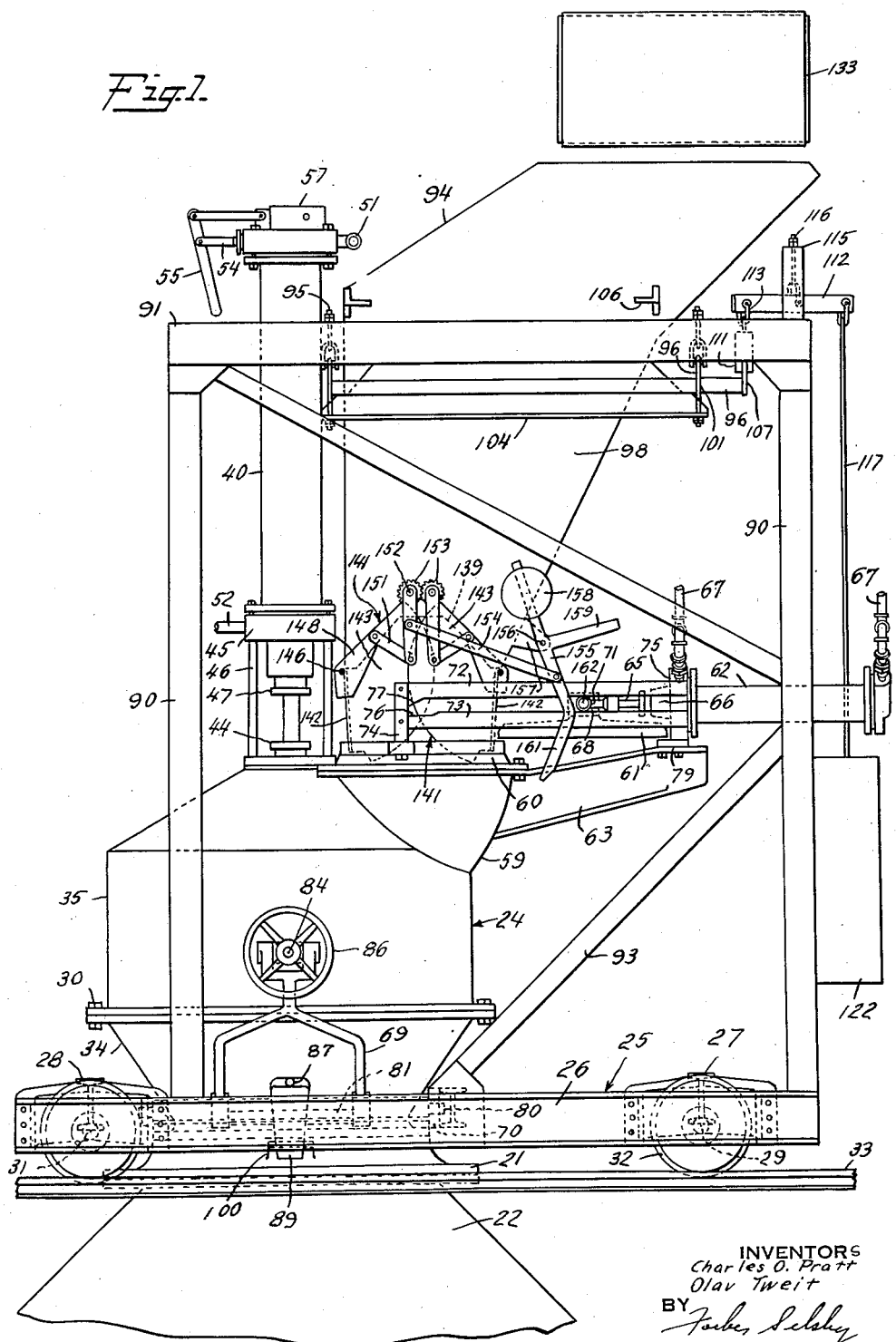
Fig. 1 is a side elevation of a charger positioned over a gas generator, fragmentarily shown.

In the drawings, reference numeral 21 denotes a removable annular casting or seat for a charging opening 22, provided in the upper portion of a gas generator. The casting 21 carries a depending cylindrical neck portion 23 which extends downwardly into the generator to form a guide or chute for the fuel introduced into the generator from the charger hereinafter described.

The charging apparatus of this invention includes a fuel magazine 24 mounted on a carriage or truck frame 25 composed of longitudinal channel bars 26 connected by cross bars 27 and 28. Axles 29 and 31 on the cross bars have rotatably journaled thereon car wheels 32 designed to ride on rails 33 between which the charging opening 22 of the gas generator is located.

Figure 2:
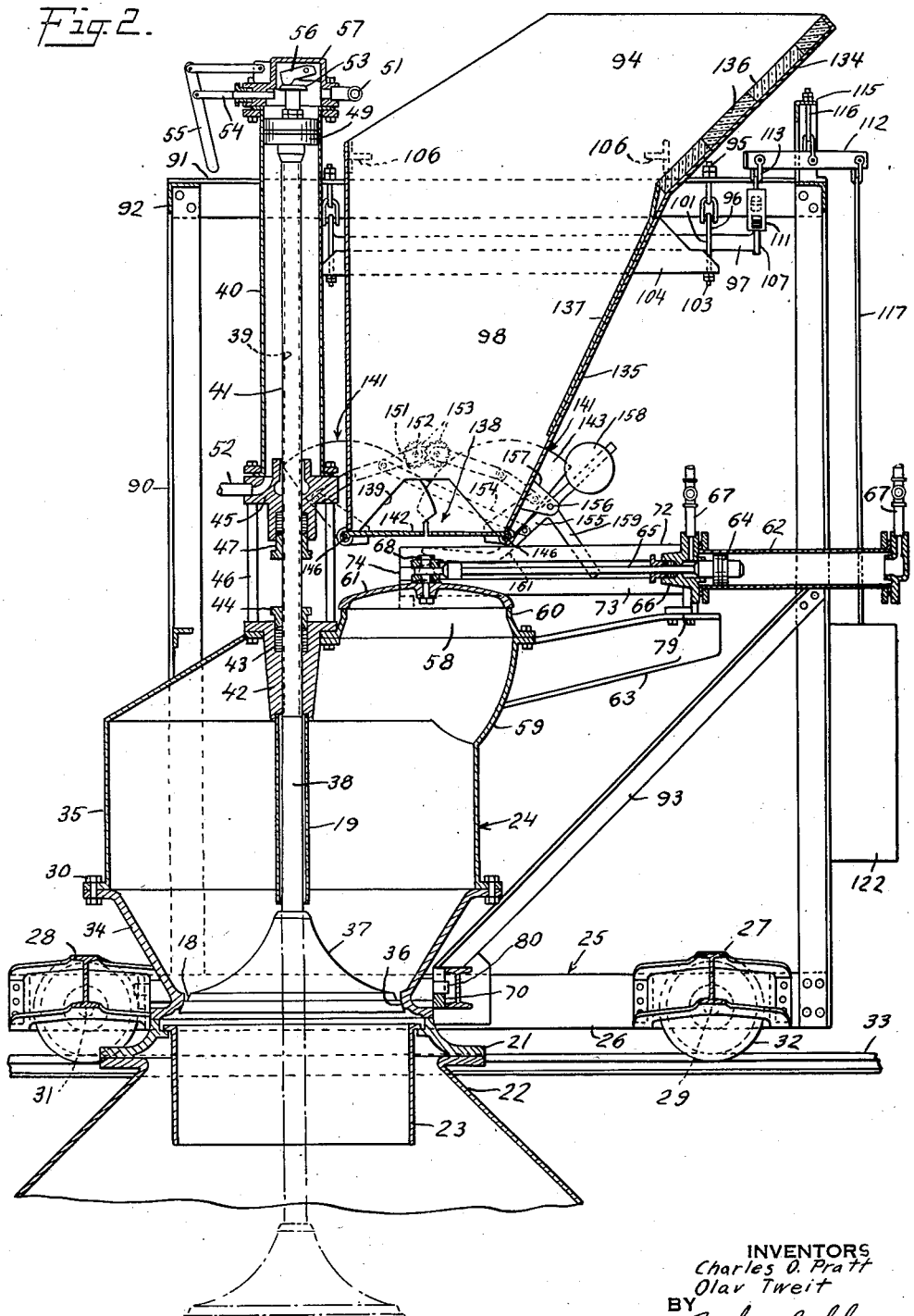
Fig. 2 is a vertical section, partly in elevation, through the charging machine, the section being taken through the charging machine in a vertical plane, passing through the mid portion of the magazine and hopper.

The magazine 24 may consist of two portions; a lower portion 34 and an upper portion 35 secured by bolts 30, positioned around the periphery of the fuel magazine and extending through contacting flanges on the top of base 34 and the bottom of upper portion 35. Portion 34 is preferably of cast construction so that it is rugged and durable. The upper portion 35 of the magazine may be of steel plate. The base of portion 34 is tapered to form a seat 36 for a vertically reciprocating combined spreader and closure member 37 which when seated seals the discharge outlet in the bottom of the magazine 24. Spreader member 37, preferably of conical shape, as shown in Fig. 2, is mounted on a shaft 38 constituting an extension of a piston rod 39 of a hydraulic cylinder 40. This cylinder functions to reciprocate the spreader member 37.

It will be noted that the portion of shaft 38 which extends up from spreader 37 within the magazine 34 is of somewhat greater diameter than the piston rod 39. An elongated sleeve 41, preferably of brass, protects the piston rod 39. This sleeve extends from a piston 49 through a head 45 for the hydraulic cylinder 40 and a bearing support 42 located in the wall of the magazine 24, down to the top of the enlarged shaft portion 38. Sleeve 41 is concentric with the piston rod and is disposed so that it forms a continuation of the circumferential surface of shaft 38 as shown in Fig. 2. Movement of piston 49 causes movement of sleeve 41, piston rod 39, and integral shaft portion 38, operatively connected with the piston. By the construction hereinabove described, the piston rod is effectively protected against wear and the corrosive effect of gases escaping from the generator and the effective life of the operating mechanism for the spreader 37 is prolonged. An auxiliary sleeve 19, extending from bearing support 42 encases shaft 38 when the closure 37 is in seated position, protecting the shaft 38 from erosion and the stresses and strains occasioned by the charging of the magazine. The sleeve 19 is of greater diameter than sleeve 41 and permits sliding movement of the latter therein upon the lowering of the distributor or closure 37 into discharge position within the generator, indicated in broken lines in Fig. 2.

As indicated above, sleeve 41 reciprocates in the bearing support 42, disposed on the top of the magazine 24. Recess 43 positioned at the top of bearing 42 is provided with suitable packing material and a split gland member 44 to form a fluid tight joint for the piston rod encased in sleeve 41 at the point where the sleeve extends from the magazine. This joint and the bearing supports for the sleeve, it will be noted, are readily accessible from the exterior of the magazine for adjustment and replacement.

Hydraulic cylinder 40 is suitably supported above magazine 24, as for example by spacer bars 46, secured to the top of the magazine and to the head 45 of the hydraulic cylinder disposed above the magazine. A packing gland 47, similar to packing gland 44, is located in head 45 to provide a fluid tight joint between the sleeve for the piston rod and the head 45. Ports 51 and 52 at the ends of the cylinder 40 permit ingress and egress of the actuating fluid. These ports may be connected by suitable pipe connections with control mechanism for regulating the flow of pressure fluid into and from the hydraulic cylinders operating the spreader and the cover for the magazine hereinafter described. This control mechanism may, in turn, be operatively associated with the control nest of the water gas set so that the operation of the charger is synchronized with that of the generator. The construction and operation of such control mechanism is disclosed and claimed in George R. Steere's pending application, Serial No. 305,848, filed September 13, 1928, and per se, forms no part of this invention.

Piston rod 39 extends beyond the piston 49 and is provided on its top with an annular flange 53. A latch member 54, arranged to be moved by hand lever 55, is disposed at the top of the hydraulic cylinder, the latch being adapted to engage under flange 53 to maintain the spreader element in seated position when desired. The latch above described may be used to maintain the spreader 37 in closed position when the charger is moved from one point to another.

A lever 56 is pivotally mounted in the top of head 57 of the hydraulic cylinder 48. End 53 of piston rod 39 in its upward movement contacts with lever 56, swinging it to close a mercury switch or other switch of any preferred type (not shown), operatively connected to lever 56. The switch forms part of the control mechanism for the charger described in the aforementioned Steere application, Serial No. 305,848, closing of the switch permitting continued operation of the charger in timed relation with that of the generator. If for any reason the spreader is not returned to seated position and the lever 56 is not moved to close the switch associated therewith, the switch remains open and causes discontinuance of the operation of the charger, permitting the operator to rectify the condition preventing proper return of the spreader to seated position.

Magazine 24 is provided with a circular inlet 58 which preferably is disposed at one side of, and eccentric to, the vertical axis of the magazine. In the embodiment of the invention disclosed, the inlet consists of a flanged protuberant portion, or charging nozzle 59 to which is bolted or otherwise secured a removable flanged seating member 60. As shown in Fig. 2, the flanges of the seating member 60 and nozzle 59 are bolted together. Thus, a removable and renewable seat is provided for a cover 61, which is arranged to seal the inlet to the fuel magazine.

A hydraulic cylinder 62, mounted on bracket 63 extending from the fuel nozzle 59, moves cover 61 in a horizontal plane from a position sealing inlet 58, shown in Fig. 2, to a position away from this inlet depicted in dotted lines in Fig. 1. Pressure fluid for a reciprocating piston 64 of hydraulic cylinder 62 is admitted into and discharged from ports 67, which may be connected with the control mechanism regulating the flow of fluid through ports 51 and 52 of hydraulic cylinder 40.

A switch preferably is associated with cover 61 in the same manner that the switch is associated with the spreader 37 to insure proper return of cover 61 to seated position, as more fully described in the aforementioned Steere application.

Piston rod 65 of hydraulic cylinder 62 extends from piston 64 through a suitable packed head 66 and is connected to cover 61 by nut and bolt connection, indicated by the reference numeral 68. Rollers 71, mounted on axles or shafts extending laterally from the top of cover 61, are arranged to travel between two sets of cam tracks or guides 72 and 73, each set being disposed laterally of the cover 61. One end of each set of tracks 72 and 73 may be suitably mounted upon and fixed to the seat 60 by standards 74 and the other end of the tracks bolted to standard 63, as indicated at 79. It will be noted from Fig. 1 that each lower track 73 is provided with a recess or depressed portion 76 disposed directly above the central portion of the cover when in seated position over inlet 58. The upper track 72 is formed directly above the recess 76 with an adjustable inclined cam-like projection or wedge 77. Thus, when cover 61, supported through the rollers 71, is moved to the left end of tracks 72 and 73, viewing Fig. 1, the rollers 71 fall into the depression 76 and are engaged by the cam portion 77, forcing the rollers and the connected cover into gas tight engagement with the seat 60 to form a gas tight seal for the inlet to the fuel magazine 24. Movement of piston rod 65 in reverse direction causes rollers 71 to ride up on the elevated portion of cam track 72, raising the cover and permitting ready removal thereof, while supported and guided by the tracks 72 and 73.

Magazine 24 is supported on truck frame 25 when the charger is not in position over the charging opening of a gas generator by bifurcated levers 69 (Fig. 3), disposed on diametrically opposite sides of the fuel magazine. Each lever 69 is secured to a shaft 80 pivotally carried in an open cradle or frame 70 fixed to the truck frame 25. The open portion of the cradle permits elevation of shafts 80 with respect to the truck frame 25 when the magazine is moved into gas tight engagement with the casting 21 on the generator. The lower end of each lever 69 is pivotally secured to the magazine 24, as indicated at 81 and the upper end pivotally engages a nut member 83, threaded on screw threaded shaft 84, through a pivot 82. The shafts 84 are pivotally secured to a side of the magazine as indicated at 85. Nut member 83 may be turned by hand wheel 86 to move the nut either to the right or left and swing lever 69 about pivot 81. Pivoted on each shaft 80 is a hook or clamp 89, which has positioned thereon or integral therewith a handle 87. Lugs 100, formed on casting 21 are arranged to be engaged by hook 89 when the magazine is in lowered position, hooks 89 pulling up on the lugs 100 and levers 69 bearing down on the magazine to give a gas-tight joint between the magazine and the generator. The structure and operation of the supporting mechanism for the magazine on the truck frame and the mechanism for lowering the magazine into gas-tight engagement with the casting on the generator is described and claimed in Patent No. 1,770,560, of July 15, 1930, and reference to this patent may be had for more detailed description of this mechanism.

Vertical angle bars 90 are riveted or otherwise secured to channels 26 and are connected at their upper ends by longitudinal angles 91 and cross bars 92, suitable intermediate bracing members 93 being employed to form a rigid frame which is carried by the truck or carriage 25. A substantially stationary fuel hopper 94 of general rectangular cross section is suspended from this frame and is arranged to be placed in counter-balancing relation with weighing mechanism hereinafter described in a manner such that only limited vertical movement of the hopper is permitted. For this purpose, two pairs of eye bolts 95, one pair at each side of hopper 94, each eye bolt of a pair being disposed in the vicinity of a corner of the rectangular portion of the hopper, are secured to angles 91. A bell crank lever 96 has its intermediate portion pivotally suspended from each eye bolt 95. A pipe lever 97, parallel to side 98 of hopper 94 is fixedly mounted in the lower end of each pair of bell cranks 96 as indicated at 101. The upper end of each bell crank has pivotally suspended therefrom an open link 102 carrying a hook eye bolt 103. Suitably secured to each side 98 of hopper 94 is an angle or flange 104. One pair of hooked bolts 103, to the left of hopper 94 (viewing Fig. 3), are secured to the ends of angle 104, while the other pair of hooked bolts to the right of the hopper is secured to the ends of angle 104, disposed at the right side of the hopper. Thus the hopper is suspended from the frame carried by truck 25 so that it can move vertically. Stops 106 are suitably disposed on the sides of the hopper 94 at a point thereon somewhat above the top of angles 91 when the hopper is empty and in elevated position, permitting descent thereof until the stops contact with angles 91.

At one end of each pipe lever 97, splice members 107 are secured, extending towards each other as shown on Fig. 3. The ends of the splices 107 are formed with knife edges 108 engaging supports or stops 109 carried by a frame 111 suspended from one end of lever arm 112 by suitable linkage 113. Lever arm 112 is in turn pivotally suspended by eye bolts and link 116 from a bridge member 115 mounted on the supporting truck frame. The other end of lever arm 112 is pivotally secured to one end of a hooked rod 117, the other end of which is hooked in link 118, pivoted to the right end of a second lever arm 119. The lever arm 119 is fulcrumed on link 121, bolted to frame 122 for the weighing mechanism (Fig. 3). Frame 122 is riveted or otherwise secured to the angles 90 of the truck. Link 123 on end 124 of lever arm 119 is engaged by a hooked rod 125, which also hooks into link 126, pivoted to one side of the fulcrum for the steelyard 127. The steelyard 127 is suspended from a hook 128 which may be integral with the frame 122 for the weighing mechanism. As customary, the steelyard is equipped with a weigh platform 129 and has slidably mounted thereon poises 131 permitting accurate weighing of the material as charged into hopper 94. The construction of this weighing mechanism per se forms no part of this invention and consequently has been described above only in such detail that the relation thereof to the invention herein is readily apparent.

From the above description, it will be noted that the hopper 94 is permitted only limited vertical movement, being otherwise substantially stationary and arranged to be placed in counterbalancing relation with the weighing mechanism, the weights placed on platform 129 determining the amount of charge which can be fed to the hopper before it overbalances the predetermined weight set on the steelyard. A mercury switch 132 is carried by the steelyard and is connected in an electric circuit with a motor (not shown) which drives conveyor 133, thus delivering material to hopper 94. Discharge of a predetermined load into hopper 94 causes it to descend, pulling down on rod 125, connected with steelyard 127 through connections 104, 103, 96, 107, 109, 113, 112, 117, 119 and 123, pulling down on the steelyard 127, opening switch 132, which interrupts the operation of the motor, with consequent interruption of delivery of material by the conveyor 133 to hopper 94.

Hopper 94 may consist of a wide, extended upper portion 134 (Fig. 2) and a lower tapering portion 135. Readily replaceable wear-resisting material 136 such as brick and an apron 137, preferably of steel, extending down from the wear-resisting material 136 along the interior of one side of the hopper 94, are preferably provided on the hopper wall immediately beneath the conveyor 133 to protect the hopper against the impact of the fuel as charged from the conveyor thereinto. Lower portion 135 of the hopper narrows to a rectangular discharge opening 138, the opposite side walls 98 of the hopper 94 being cut away as indicated at 139.

In accordance with this invention, the closure for rectangular discharge outlet 138 is designed to enter the circular inlet 58 for the fuel magazine bridging the space between the bottom of the hopper 94 and the top of inlet 58, and defining a chute for the discharge of material from the hopper into the magazine. The closure involves a pair of plates 141, one of which is shown in perspective in Fig. 4, each plate consisting of a concave base portion 142 and side extensions 143, one edge of which is substantially straight as indicated at 144, and the other edge 145 of which is arcuate in shape. The plates are pivoted at 146 to opposite sides of the base of hopper 94 so that when closed, the concave portions 142 serve to support the weight of the material in the hopper and the side extensions 143 are disposed exteriorly of the sides of the hopper in overlapping relation covering the openings 139 and the sides 98 (see Fig. 2). Movement of the plates into open position, shown in Fig. 1, causes the concave portions to fit within the circular inlet 58 of the magazine. Thus, the side extensions together with the base portions define a chute extending from discharge outlet of hopper 94 into inlet 58 through which the material gravitates from the hopper into the magazine.

The plates 141 are preferably arranged to be moved by the hydraulic cylinder 62, the piston rod of which is connected to cover 61. For this purpose each plate has pivotally fastened to a plate 148 suitably secured thereon one end of a toggle link 151. The other end of each toggle link 151 is secured to a shaft 152 rotatably journaled on the exterior wall of the magazine 94. The extensions 143 of the plates on opposite sides of the hopper are provided with like linkage operating mechanism herein described, as appears from Fig. 3. Shafts 152 to which the toggles 151 on each side of the hopper are secured have fixed thereon gears 153, which mesh so that movement imparted to one toggle is transmitted to the other by the meshing gears. One of the toggles 151 on each side of the hopper has pivoted thereto one end of a link 154, the other end of which is secured to operating lever 155, pivoted at 156 in brackets 157 riveted or otherwise secured to the hopper 94. Lever 155 has at its top end a counter-weight 158, at its approximate center a relatively short finger 159 and at its bottom end a relatively long extending arm 161, as shown in Fig. 1, the function of which will be hereinafter described.

Fig. 2 discloses the position of the closure for the discharge outlet of hopper 94 and associated operating mechanism when the closure plates are in position covering the discharge outlet. Upon movement of cover 61 to the right, viewing Fig. 2, uncovering inlet 58, plates 141 remain closed until extension 162 mounted on the shaft carrying roller 71 engages finger 159. Continued movement of the cover to the right, swinging lever 155 about its pivot 156, elevating the counter-weight 158, causes link 154 connected with the toggle 151 to move the toggles in a direction to accomplish bending of the toggles, shown in Fig. 1. The meshing gears 153 impart movement from one toggle to the other on each side of the hopper so that the toggles on both sides are moved in like extent in timed relation. The counter-weight having been thrown off center by contact of extension 162 with finger 159, it, together with the weight of the fuel in the hopper, causes lever 155 to move to the position shown in Fig. 1, the toggles bending completely, moving plates 141 into open position into the inlet 58 to define a chute bridging the space between the hopper 94 and the fuel magazine.

Return movement of cover 61 causes the extension 162 to engage relatively long arm 161 of operating lever 155, the extension 162 engaging the arm 161 throughout substantially the full length of movement of cover 61, thus positively moving lever 155 to move plates 141, to a closed position.

In operation, the charging machine is moved on its truck 25 into position over the charging hole of the gas generator, and the magazine 24 secured in gas-tight engagement with the removable casting 21 on the generator by manipulation of hand wheels 86. The ports of the hydraulic cylinders 40 and 62 are operatively connected to a source of pressure fluid, preferably actuated through suitable control mechanism, and the switches associated with the spreader 37 and cover 61 are connected in circuit with the electric motor driving conveyor 133 and the control mechanism, as fully and completely disclosed in the aforementioned Steere application, Serial No. 305,848. The weighing mechanism is adjusted in accordance with the predetermined load it is desired to have the hopper deliver to the magazine.

Assuming that the parts are in the position shown on Fig. 2, conveyor 133 delivers the fuel or other material to hopper 94. Upon delivery of a predetermined charge, the hopper descends vertically and through the linkage connections above described, pulls down on the steelyard 127, opening switch 132, which interrupts the feed of material to hopper 94 by the conveyor 133. Hydraulic cylinder 62 is then operated to remove cover 61. Upon movement of cover 61, extension 162 associated therewith strikes finger 159, moving operating lever 155 about the pivot 156 with consequent movement of the plates 141 from the position shown in Fig. 2 to that of Fig. 1, the plates defining a chute for the passage of material from the hopper into the magazine. During the return movement of cover 61, extension 162 engages long arm 161 to close cover plates 141. Discharge of material from the hopper causes the weights on the steelyard to return the magazine to its initial elevated position and close switch 132, permitting further operation of the motor driving the conveyor 133 after the closure plates 141 have been returned to closed position. The feature of having the mechanism for removing and replacing cover 61 over the discharge inlet of the magazine also controlling the closing and opening of plates 141, insures the opening and closing of plates 141 at the proper point in the cycle of operation so that the fuel hopper is placed in direct communication with the magazine only when the cover 61 is completely removed. Hence all fuel delivered to hopper 94 is discharged into the magazine and spillage and waste thereof avoided.

The latch 54 having been manually released, cylinder 40 is operated in timed relation to lower the spreader 37 into the position shown in broken lines on Fig. 2, the fuel gravitating from the magazine 24 being evenly distributed by the cylinder over the top of the fuel bed in the generator. Thereafter the hydraulic cylinder 40 operates to return the spreader 37 to seated position closing the discharge outlet of magazine 24. Return of the spreader 37 and cover 61 to seated position closes the switches associated therewith, placing the apparatus in condition for another cycle of operation described above.

The design of the charging apparatus, as to dimensions and general arrangement and as to details of construction may, of course, be varied according to the purpose for which the charger is used. Many slight variations may be introduced for special purposes. The possible variations and details of construction and arrangement are too numerous to be mentioned in a patent specification. It will be understood, therefore, that this invention is not to be limited to the illustrative embodiment herein disclosed.

We claim:

1. A charger for a gas generator comprising a supporting frame, a fuel magazine on said frame, said magazine having a charging inlet and a discharge outlet, the latter being located in the bottom of said fuel magazine to discharge fuel from said fuel magazine into said generator, a vertically reciprocal closure for said outlet arranged to effect closure thereof and to distribute the fuel to the generator when in open position, a hopper suspended from said frame so as to permit only limited vertical movement thereof, said hopper extending vertically downwardly from the top of said frame and arranged to deliver fuel to said magazine and weighing mechanism carried by said frame and disposed exteriorly of said hopper, said hopper being arranged to be placed in counter-balancing relation with said weighing mechanism.

2. A charger for a gas generator comprising a truck frame, a fuel magazine on said frame having a discharge outlet located in the bottom of said fuel magazine to discharge fuel from said fuel magazine into said generator, a closure for said outlet arranged to effect closure thereof and to distribute the fuel to the generator when in open position, a hopper suspended from the top of said frame so as to permit only limited vertical movement thereof, said hopper extending vertically downwardly from the top of said frame and arranged to discharge into said fuel magazine and weighing mechanism on the frame disposed exteriorly of said hopper, said hopper being arranged to be placed in counter-balancing relation with said weighing mechanism.

3. In combination with a gas generator, a fuel magazine positioned over said generator and adapted to discharge fuel thereinto, said magazine being provided with an inlet, a hopper for delivering fuel to said fuel magazine, said hopper having limited vertical movement only, said hopper having a discharge opening permanently positioned over and spaced from said inlet, closure plates for said discharge opening, and means to move said plates to alternately close said opening and to provide a substantially closed conduit for the passage of fuel from said discharge opening through the inlet into the magazine.

4. In combination with a gas generator, a carriage arranged to be removably secured to said generator, a supporting frame on said carriage, a fuel magazine mounted on said carriage, said magazine having an inlet, a weigh hopper, means for suspending said weigh hopper from said supporting frame, so as to permit limited vertical movement only of said weigh hopper, means to feed fuel to said weigh hopper, weighing mechanism on said carriage arranged to control the feed of fuel to said weigh hopper, said hopper having a discharge opening permanently located directly over said inlet, and a closure for said weigh hopper arranged to alternately close said discharge opening and provide a substantially closed conduit for conducting fuel from the weigh hopper to said fuel magazine.

5. A charger comprising a magazine having a circular inlet, a hopper having a rectangular discharge opening arranged to discharge material into the circular inlet of said magazine and a closure for said discharge outlet comprising a pair of concave base plates having side extensions, said plates being arranged to be moved so that the concave base plates fit within the circular opening and the side extensions cooperate with the base plates to define a chute for the discharge of material from the hopper to the magazine.

6. In combination with a gas generator, a carriage arranged to be removably secured to said generator, a fuel magazine mounted on said carriage, a charging nozzle for said fuel magazine, a hopper mounted on said carriage adapted to contain a charge of fuel, a discharge opening in said hopper positioned over said charging nozzle, a cooperating pair of concave plates located adjacent the opening of said hopper to alternately close said opening and conduct fuel from said hopper into said charging nozzle, each plate being of a size to close approximately one-half of the bottom of said hopper, side plates integral with and vertically positioned at the sides of said concave plates, all of said plates being adapted to rotate about axes located adjacent the bottom of the hopper, toggle members associated with said side plates for opening and closing said plates, and means to actuate said toggle members to open and close said plates.

7. In combination with a gas generator, a fuel magazine positioned thereover, a charging nozzle for said fuel magazine, a closure for said charging nozzle, a hopper positioned above said fuel magazine adapted to contain a charge of fuel, a discharge opening in said hopper positioned over said charging nozzle, a cooperating pair of bottom plates located adjacent said opening to alternately close the opening and conduct fuel from said hopper into said charging nozzle, each plate being of a size to close approximately one-half of the bottom of said hopper, side plates integral with and vertically positioned at the sides of said bottom plates, all of said plates being adapted to rotate about axes located adjacent the discharge opening of said hopper, toggle members associated with said side plates, linkage means for operating said toggle members to move said plates into open or closed position, and means for removing the closure for said charging nozzle, said latter means also operating said linkage means.

8. A charger comprising a fuel magazine, a charging nozzle for said fuel magazine eccentrically located with respect to the axis of said fuel magazine and provided with an opening, a closure member for said opening, a supporting bar attached to said closure member, guides for said bar extending from a point over said opening to a point spaced from said opening, said guides being formed at the point above said opening with cam portions adapted to wedge said closure member securely in closed position over said opening.

9. In combination with a gas generator, a fuel magazine mounted thereon and provided with an opening to discharge fuel from said fuel magazine to said generator, a vertically reciprocal closure element for said opening arranged to alternately effect closure thereof and to distribute the fuel from the magazine to the generator when in open position, a shaft connected to said closure extending from the element up through the magazine to a point exteriorly thereof, a sleeve surrounding said shaft and movable therewith to move said closure, and an auxiliary sleeve within the magazine, covering the portion of the shaft within the magazine, the auxiliary sleeve being of greater diameter than and concentric with the first mentioned sleeve to permit the latter to move in the auxiliary sleeve.

10. In combination with a gas generator, a carriage arranged to be removably secured to said generator, a supporting frame on said carriage, a fuel magazine mounted on said carriage, said fuel magazine being provided with an opening communicating with said generator, a closure for said opening arranged to distribute fuel to the generator when in open position, said member being adapted to be vertically reciprocated along the axis of the fuel magazine, a charging nozzle for said fuel magazine comprising a rounded, protuberant portion eccentrically located with respect to the axis of said fuel magazine, a closure member associated with said charging nozzle, means to horizontally reciprocate said closure member from a closed position to an open position, and means to securely wedge said member in place when in closed position, a weigh hopper, means for suspending said weigh hopper from said frame so as to permit limited vertical movement of said hopper, means to feed fuel to said weigh hopper, weighing mechanism on said carriage, said weigh hopper being arranged to be placed in counterbalancing relation to said weighing mechanism, an opening in the bottom of said weigh hopper located over said charging nozzle, and means mounted adjacent said opening to alternately close said opening and conduct fuel from the weigh hopper to said fuel magazine, said means being actuated by reciprocation of the closure member for said charging nozzle.

11. A charger comprising a hopper having a discharge opening, a fuel magazine having an inlet spaced below said discharge opening, a closure for said discharge opening of said hopper arranged to alternately close the bottom of the hopper and bridge the space between the discharge opening of the hopper and the inlet for the fuel magazine to conduct material from said hopper to said magazine, a closure for said inlet of said fuel magazine, means for operating said closure for said inlet to remove it from said inlet and return it to close said inlet, and means for operating said closure for said discharge opening involving a projecting member, operation of said last mentioned means being initiated by contact of said first mentioned means with said projecting member.

CHAS. O. PRATT.
OLAV TWEIT.